United States Patent [19]
Jones et al.

[11] Patent Number: 5,155,525
[45] Date of Patent: Oct. 13, 1992

[54] METHOD OF EXPOSING SENSITIZED GRAPHIC ART FILM AND PAPER

[75] Inventors: Robert S. Jones; John J. Maurer, both of Rochester, N.Y.

[73] Assignee: Eastman Kodak Company, Rochester, N.Y.

[21] Appl. No.: 706,569

[22] Filed: May 28, 1991

Related U.S. Application Data

[63] Continuation of Ser. No. 438,564, Nov. 17, 1989, abandoned.

[51] Int. Cl.⁵ .............................. G03B 27/10
[52] U.S. Cl. ..................... 355/132; 355/71; 355/91
[58] Field of Search ............. 355/71, 85, 86, 87, 355/84, 91, 92, 93, 94, 132

[56] References Cited

U.S. PATENT DOCUMENTS

| | | | |
|---|---|---|---|
| T903,018 | 10/1972 | Dexter | 355/71 |
| 2,988,979 | 6/1961 | Sigler . | |
| 3,007,390 | 11/1961 | Forester et al. | 355/84 |
| 3,200,730 | 8/1965 | Heier | 355/78 |
| 3,385,192 | 5/1968 | Qwarfort | 355/84 |
| 4,029,404 | 6/1977 | Mizukami et al. | 355/91 |
| 4,466,737 | 8/1984 | Hastings | 355/84 |
| 4,707,116 | 11/1987 | Newiger et al. | 355/84 |

Primary Examiner—Monroe H. Hayes
Attorney, Agent, or Firm—Robert L. Randall

[57] ABSTRACT

A method of contact printing comprising the steps of supporting a film and an original in superposed relationship. A vacuum is progressively applied to the superposed film and original from a first edge to an opposite edge thereof to hold them in substantially intimate contact while simultaneously moving a source of collimated light over the surface of the superposed film and original and exposing the film through the cover sheet and the original.

3 Claims, 3 Drawing Sheets

METHOD OF EXPOSING SENSITIZED GRAPHIC ART FILM AND PAPER

This is a continuation of application Ser. No. 438,564, filed Nov. 17, 1989.

RELATED APPLICATIONS

The present application is related to our co-pending applications entitled A CONTACT PRINTER FOR EXPOSING SENSITIZED GRAPHIC ART FILM AND PAPER, Ser. No. 438,565, A COMPACT LIGHT COLLIMATOR FOR A SCANNING CONTACT PRINTER, Ser. No. 440,577, A COMPACT CONTACT PRINTER WITH A FLEXIBLE TRANSPARENT COVER SHEET, Ser. No. 438,822, A REMOVABLE COVER SHEET ROLL FOR A CONTACT PRINTER, Ser. No. 438,567, and COVER SHEET CLEANING MEANS FOR A CONTACT PRINTER, Ser. No. 440,576, all filed on even date herewith.

BACKGROUND OF THE INVENTION

Contact printing or exposure is a traditional graphic arts procedure for generating same size, high resolution reproductions of line and halftone film images. This technique ensures faithful original film image reproduction by placing the original film image in intimate contact with a receiving film or paper emulsion and, in the presence of a vacuum to hold them in intimate contact throughout the exposing process, exposing through the original film image to the receiving film or paper by means of a point or reflected light source. Typically, these images are of a relatively large size in order to meet the needs of the graphic arts industry and thus require large format originals and receiving films and the equipment necessary to handle such sized films.

Traditional silver halide contact films have sufficient photographic visible light sensitivity that the contacting exposure can be carried out with a simple, low cost, low energy tungsten light source. However, because of the sensitivity of these films to visible light, the contact exposure must be carried out in a darkroom environment. This causes a major inconvenience for the operator and results in a loss of productivity in the graphic arts production process.

In an attempt to improve graphic arts contact exposure productivity, film manufacturers have developed normal roomlight handling contact films. These films are photographically very insensitive to visible light, but have a relatively high UV sensitivity (although, in fact, having a relatively low UV sensitivity compared to the UV sensitivities of darkroom-handled film). These roomlight-handled films have improved the productivity of graphic arts contact exposure operations by eliminating the bottlenecks of the darkroom environment. However, they have also increased the use of high intensity, expensive, high UV output light sources. Metal halide light sources are a common type of UV light source used to expose these films.

One of the most important aspects of the graphic arts contact exposing or printing process is the need for accurately reproducing very fine lines and halftone dots. This has resulted in the requirement that the exposing light be collimated at the exposing plane so that such lines and dots can be reproduced accurately without undercutting or spreading and changing the size of the reproduced line or dot and the resulting image. Adequate light collimation has been achieved in the past by using a point light source mounted at a sufficiently great distance from the exposing plane that the light is substantially collimated by the time it reaches the exposure plane.

Given the large exposing plane area necessary for graphic arts purposes, the need for a high degree of light collimation to achieve accurate image reproduction, and the relative low photographic UV sensitivities of roomlight handling contact films, a high energy, expensive metal halide source has heretofore been required to expose these films. These high intensity UV light sources have required that the operator be shielded from the light source to avoid exposure to harmful UV radiation. Examples of such arrangements are illustrated in U.S. Pat. Nos. 4,029,404, 4,316,669, and 4,437,759. As a result, the total volume of space required for the graphic arts contact exposing set-ups of the prior art has been large and, since most printing shops have more than one of these exposing set-ups, the total volume of space required is significant.

Thus, a contact printer which is of compact size, provides the desired accurate reproduction of graphic arts images, and is relatively simple and low cost, all the while providing the requisite productivity, would find ready acceptance in the graphic arts industry.

SUMMARY OF THE INVENTION

Accordingly, the present invention provides a method of contact printing comprising the steps of supporting a film and an original in superposed relationship. A vacuum is progressively applied to the superposed film and original from a first edge to an opposite edge thereof to hold them in substantially intimate contact while simultaneously moving a source of collimated light over the surface of the superposed film and original and exposing the film through the cover sheet and the original.

Further, the present invention provides a method of contact printing comprising the steps of supporting a photosensitive film and an original containing an image to be reproduced in superposed relationship on a vacuum table. An elongated beam of collimated photoactive light is provided for exposing said film through the original. The method includes the step of moving the light transversely of the length of the beam over the vacuum table surface over the superposed film and original whereby the superposed film and original are scanned by the light so that the light exposes the film through the original. A transparent cover sheet is applied over the superposed film and original as the light is moved over the film and original.

Still further, the present invention provides a method of contact printing comprising the steps of supporting an ultraviolet-radiation sensitive film and an at least partially transparent original containing an image to be reproduced in superposed relationship on a vacuum table. An elongated beam of ultraviolet light is provided for exposing the film through the original with the beam having a length substantially equal to one dimension of the film and a relatively narrow width. The beam of light is moved transversely of the length of the beam over the vacuum table surface over the superposed film and original whereby the superposed film and original are scanned by the ultraviolet light exposing the film through the original. A transparent cover sheet is applied over said superposed film and original as the light is moved in a first pass over the film and original and is removed as the light is returned to the starting position. The light is collimated with means disposed between the light and the cover sheet. The ultraviolet light intensity is sensed at the vacuum table surface and the exposure speed of the film is registered, and the speed of the light moving means is regulated in response to the exposure speed of the film and the sensed intensity of the light. Thus, the light moving speed is varied in direct relationship with the light intensity and the exposure speed.

Various means for practicing the invention and other features and advantages thereof will be apparent from the following detailed description of an illustrative preferred embodiment of apparatus for carrying out the method of the invention, reference being made to the accompanying drawings.

DESCRIPTION OF THE PREFERRED EMBODIMENT

Figure 1:
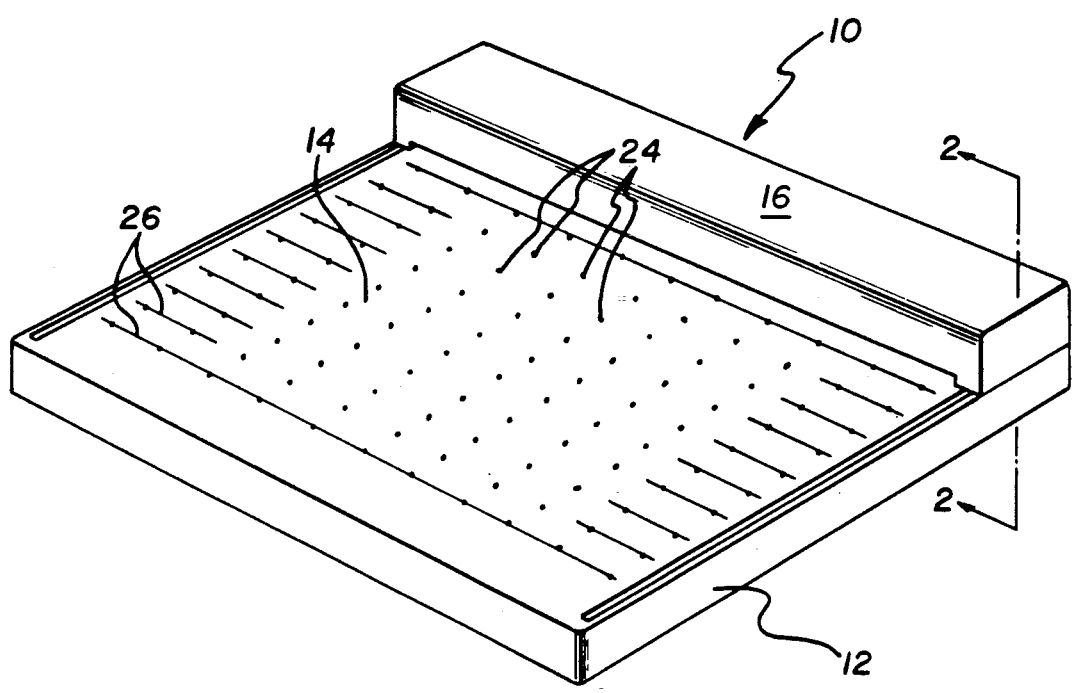
FIG. 1 is a perspective view of a preferred embodiment of the present invention.
Figure 2:
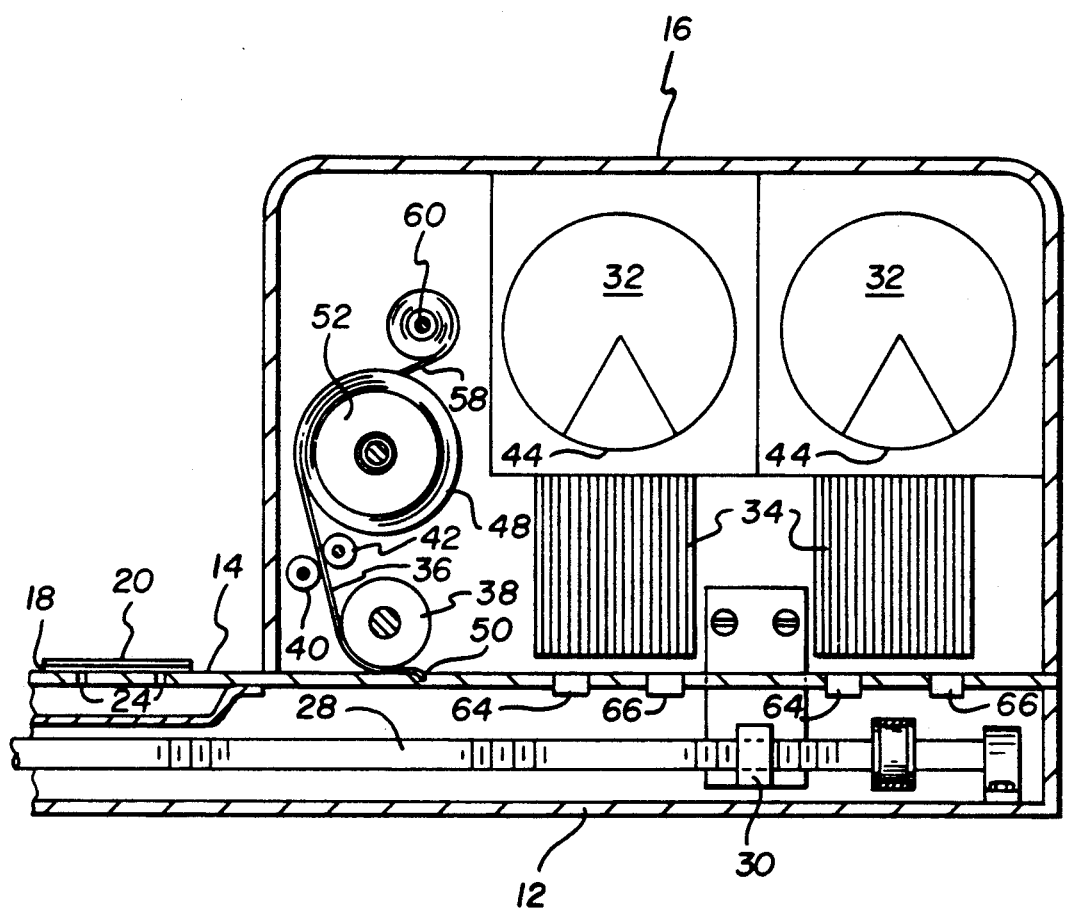
FIG. 2 is a cross-sectional view of the light trolley taken along line 2—2 of FIG. 1.

Referring now to FIGS. 1 and 2, a preferred embodiment of a contact printer 10 for practicing the method of the present invention is illustrated. The contact printer comprises a platen member 12 having a planar upper surface 14 with dimensions slightly larger than the maximum dimensions of the largest original to be copied thereon. A light carriage 16, having a length approximately equal to one dimension of the platen member 12, is arranged to be moved across the platen transversely to the length of the carriage, thereby providing coverage of the entire platen during its movement.

The upper surface of the platen member 14 forms a vacuum table for the film 18 and the original 20 which are superposed thereon for exposure of the film (see FIG. 2). A rigid chamber 22, having a thickness of approximately one inch, is formed beneath the vacuum table. A plurality of vacuum ports 24 are formed in the film/original accepting portion of the surface 14 and communicate between the surface and the interior of the chamber. With the exception of the vacuum ports 24, the chamber 22 is sealed so that a vacuum pump (not shown, but normally disposed remote from the apparatus) can pull a vacuum within the chamber which is then applied, via ports 24, to the film and original which are placed on the surface 14. The ports 24 have a diameter of approximately 0.040 inch which is sufficiently large to effectively apply the vacuum to the film/original disposed on the surface 14, but is sufficiently small and the capacity of the vacuum pump is great enough that it will maintain the vacuum even though the size of the film/original is less than the maximum, leaving some of the vacuum ports uncovered. The vacuum ports outside of the area covered by the maximum size film/original are connected by shallow grooves 26 having a cross section of 0.015 inch by 0.015 inch which permit air trapped between the film/original and a cover sheet (to be further described hereinbelow) to be evacuated. It has been found that satisfactory operation can be achieved with a vacuum pump which is capable of flow rates of between 15 and 30 cfm while generating a vacuum within the chamber of between 8 and 12 inches of water.

The light carriage 16 is disposed on the upper surface of the vacuum table and is arranged to be moved across the table from a home position (the rear of the vacuum table in the example illustrated) to the opposite edge of the table, and returned to the home position. The carriage is provided with wheels (not shown) at each end thereof which ride upon tracks (not shown) provided at the lateral edges of the platen surface 14 or within the platen. The carriage is driven by a drive screw 28 within and extending the length of the platen which engages and drives a drive-nut 30 connected to the carriage. The drive screw is driven by a variable speed, reversible motor (not shown) located within the platen.

The light carriage 16 carries one or more high UV output fluorescent aperture lamps 32, with an associated mechanical light collimator 34 positioned beneath each lamp, a roll of a transparent cover sheet 36, an associated pressure roller 38, and a pair of cleaner rolls 40 and 42.

The fluorescent lamps 32 are long tubular bulbs extending the length of the carriage. The phosphors which coat the inner walls of the bulbs are selected to generate light having a wavelength in the range of 350 nm to 460 nm, which matches the sensitivity of the film being exposed. The bulbs have an internal reflective layer between the phosphor and the envelope glass which covers a major angular portion of the envelope wall and reflects a high percentage of the radiation striking it. A clear window 44, having an aperture of about 60° of the bulb circumference, is provided along the length of the bulb with no phosphor or reflective layer. This window produces an elongated, concentrated beam of high luminance UV light output along the length of the bulb because the reflective coating directs the major part of the bulb output through the uncoated window. The lamps are selectively oriented in the carriage with the windows 44 directed downwardly so that the beam of concentrated light is directed toward the sensitized film material 18.

It has been found that, since there is a limit to the amount of exposing energy each bulb can produce, with slower speed films the exposure times become excessively long with only one bulb. Also, the use of only one bulb reduces the dynamic exposure range available to produce such effects as spread and choke. Two bulbs provide a more stable exposing device and reduce the total time of scanning necessary for proper exposure. More than two bulbs may be used to enhance productivity by permitting faster scanning speeds for slower speed films. However, the use of additional bulbs will increase the amount of heat produced thereby, requiring the use of means to enhance the heat removal, such as a fan (not shown).

Figure 3:
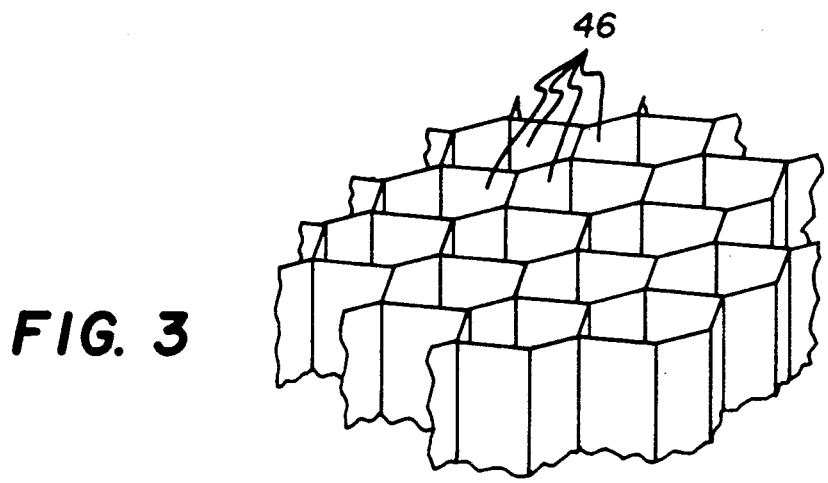
FIG. 3 is a perspective view of a portion of the light collimator.
Figure 4:
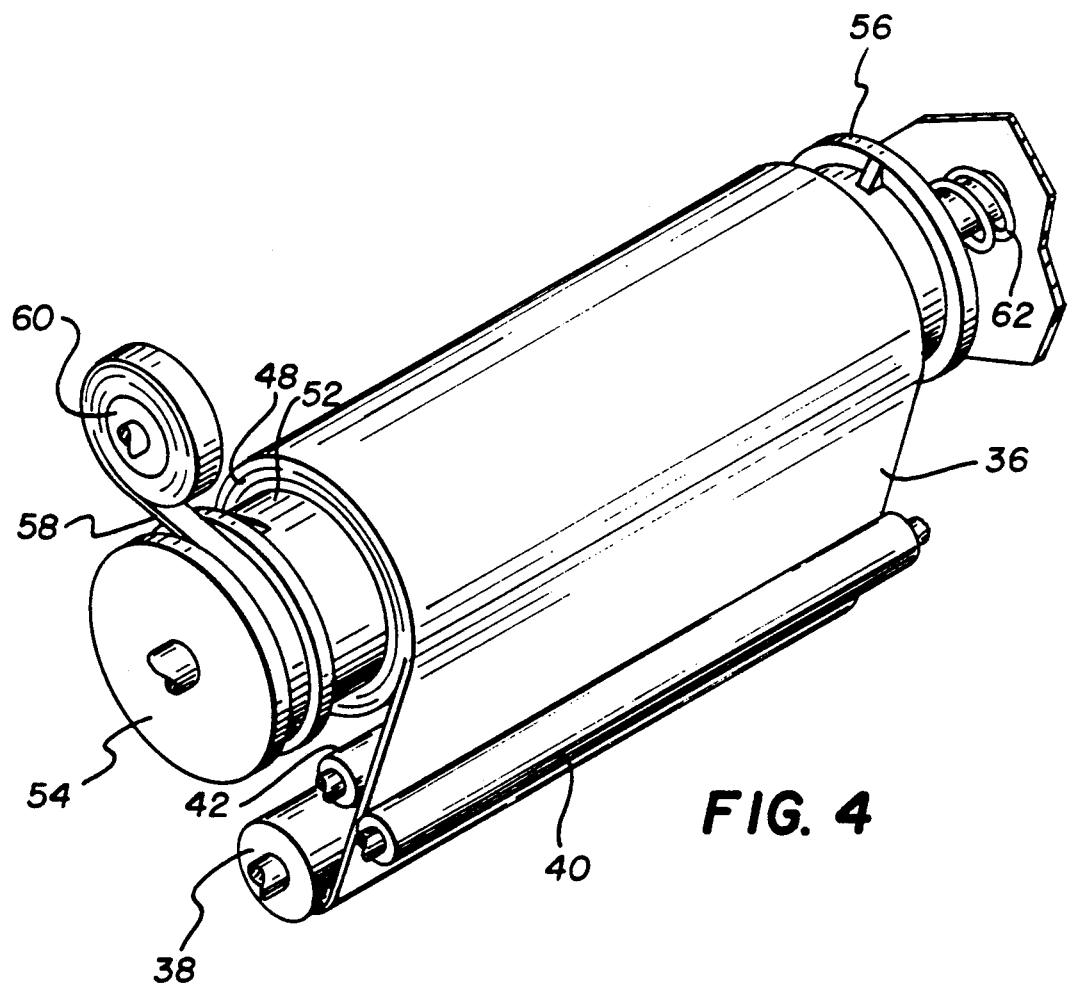
FIG. 4 is a perspective view of the cover sheet applying assembly.

The mechanical light collimator 34 associated with each bulb comprises a plurality of parallel, fine collimator tubes 46 which are closely spaced and which transmit parallel rays of light from the fluorescent aperture lamp to the exposure plane. While the optimum tube shape for the light collimator is a cylinder, because it gives uniform image quality in all directions, it has been found that tubes having a hexagonal cross section provide close approximation to the cylinder, are easier to fabricate, and provide greater useful area for light transmission as a light collimator (see FIG. 3). The inner surface of the tubes are provided with a non-reflective black coating whereby light rays which are not parallel to the tube axes are absorbed. Inasmuch as image quality is related to the solid angle of the light incident on the original/film lamination surface, based on a given distance between the sensitized film emulsion and the image of the original, the equivalent diameter of the tubes and their length are selected to extinguish incident angles of light at the exposure plane greater than a predetermined solid angle, for example a solid angle of between about 3° and about 9°. Moreover, since the illumination at the film surface depends upon the light output of the lamp and the distance of the lamp from the film surface, for a given lamp output, the shorter the length of the collimator, the greater the exposure power at the film. A preferred embodiment employs hexagonal tubes having an equivalent diameter of 0.125 inch and a length of 0.5 inch, with the bottom of the tube spaced above the film plane a distance of 0.5 inch.

The transparent cover sheet 36 has dimensions substantially equal to the width and length of the vacuum table and is supported as a roll 48 mounted in the carriage 16 parallel with and ahead of the flourescent tubes (as viewed with respect to the initial travel of the carriage). The outer, free end of the cover sheet is releasably connected to the vacuum table as indicated at 50. The cover sheet is wrapped on a core 52 which is removably held at each end by hub members, 54 and 56, rotatably mounted in the carrier. One hub 54 is connected to one end of a constant force tension spring 58 which acts to apply tension to the roll of the cover sheet material as it is unwound and wound by movement of the carriage across the vacuum table, as will be further described hereinbelow. The other end of the tension spring is connected to and wrapped on a storage drum 60 where it remains in its idle position. Through the unwinding force generated as the cover sheet is unwound, the spring is transferred onto the core hub 54, and produces the winding torque moment to the shaft of the core to rewind the cover sheet when the carriage movement is reversed. The other hub 56 is spring loaded along the core axis by an axial compression spring 62. The axial compression spring permits the hub 56 to be moved axially, disengaging the cover sheet roll to permit its easy replacement.

The cover sheet 36 is formed of an impermeable sheet of a polymeric material which is substantially transparent to UV radiation. The material also preferably resists abrasion and possesses anti-static properties, or is treated to obtain these properties, so that it resists the accumulation of dust, dirt, and other materials which would adversely affect the transmission of exposing light therethrough, or which would adversely affect the collimation of the light. It has been found that clear polyester sheeting having a thickness of approximately 0.004 inch satisfactiorily meets these requirements. The cover sheet acts as a "vacuum lid" as it is unwound over the original/film laminate during vacuum drawdown as the carriage is moved across the vacuum table to expose the film. The cover sheet also protects the original/film laminate underneath from any abrasive action of the pressure roller 38 as it forces the cover sheet/original/film lamination into intimate contact to remove any air from the lamination which might otherwise distort the resulting exposure.

Because of its importance to the satisfactory exposure of the contact print, the cover sheet can be cleaned with a soft cloth if necessary, or be replaced if it loses its transparency or becomes damaged. As an aid to keeping the cover sheet optically clean and free from dust and lint, the cleaner rolls 40 and 42 are mounted transversely of the light carriage 16 between the cover sheet roll 48 and the pressure roller 38 in engagement with the front and rear surfaces of the cover sheet 36. The cleaner rolls are formed of a single component urethane having 20 durometer Shore A hardness which clean the cover sheet without scratching as it is extended and retracted during each exposure cycle.

Should it be desired to use registration pins to hold the film and the image-bearing separations or originals in proper alignment during exposure, cooperating clearance holes (not shown) can be provided in the cover sheet 36. The clearance holes allow the cover sheet to lie flat around the registration pins as it is unwound over the original/film laminate.

Exposure Control

A pair of photocells, 64 and 66, are provided for each flourescent bulb and are disposed in the upper surface of the vacuum table under each bulb when the light carriage 16 is in the "home" position, as illustrated in FIG. 2. The photocells monitor each fluorescent aperture bulb continuously when the light carriage is in home position. Each photocell collects energy over a limited bandwidth from the light source and feeds the exposure intensity level to a microprocessor (not shown). One photocell is used to monitor the higher UV spectrum (350 nm to 410 nm) and the other is used to monitor the "blue" band spectrum (410 nm to 460 nm). The dual system allows more accurate control over the exposure of a particular film or paper. Since the photocells can detect lamp changes and optical degradations, the microprocessor can use the information to keep the exposure levels consistent. The photocell system can also be used to indicate when maintenance is required, such as cleaning the bulbs or replacing them.

The output of each photocell is an analog voltage signal which is proportional to the intensity of the light received by the photodiode and, in the preferred example, can range from 0 to +10 volts. An input device is provided (not shown) to register the photographic speed of the film being exposed. These signals go to an analog/digital converter in the microprocessor, with the digital values being used to calculate the proper speed for the light carriage containing the fluorescent lamps across the exposure plane to provide the necessary exposure to the film. The resulting output is then used to control the light carriage drive motor speed.

Operation

Initially, the light carriage 16 is parked at the rear of the vacuum table 14. A sheet of film or paper 18 is positioned emulsion side up on the platen. The longest sheet dimension is preferably perpendicular to carriage motion to minimize the carriage travel necessary to fully cover the sheet and thus keep the time required to a minimum. The vacuum pump is activated and applies the vacuum to the film through the ports 24 to hold the film to the platen surface. The original 20, such as a color separation, is then placed on top of the film. The separation can be positioned by means of registration pins (not shown). If registration pins are used, they are located along the edge of the original/film laminate closest to the carriage home position. The type of film or paper to be exposed, or the exposure speed thereof, is entered into the machine controller. The film information and lamp intensity readings are then used to calculate the carriage traverse speed. When the "start" button is actuated, the carriage moves 16 forward toward the front edge of the platen 14 at the proper dot-for-dot exposure speed. While the carriage moves forward, the clear anti-static cover sheet 36 is unwound to cover the original/film lamination. The pressure roller 38 pushes out any remaining air from the lamination and the cover sheet is drawn into intimate contact with the lamination by the vacuum through the ports 24. The carriage continues until the "end of travel" position is reached and reverses direction to finish exposing the film and return to the home position. As the carriage returns to the home position, the cover sheet 36 is rewound on the core 52 by the constant tension spring 58, uncovering the original/film lamination after exposure for that area has been completed. It is apparent that with small film sizes, complete traverse of the platen by the carriage is not necessary. The "end of travel" position is selectable and can be specified by the user. When the carriage is back at home position, the vacuum and the lamps are shut off or placed on standby, and the film and/or the separation can be removed.

Alternative Embodiments

The preferred embodiment of the present invention has been illustrated as configured to rest on a table top or workbench. It will be apparent that it would be possible to construct the present invention as a stand alone device. The platen could be folded up or down when not in use. Alternatively, the present invention could be wall mounted. The wall mount version could be used where space is at a premium or in multi-functional work areas.

It will be further apparent that the present invention can be configured so that the light carriage moves from side to side rather than from back to front. Still further, the cover sheet can be formed of a material which is only transparent to UV radiation. Other forms of the cover sheet cleaner rolls may also be employed. Similarly, the drive screw can be replaced by suitable drive belts, chains, or cables.

In situations where the quantity of exposure lumination is more critical than the collimation of the light at the exposure plane, it is possible to use collimation tubes which are provided with reflecting inner surfaces. Such reflective tubes would provide greater lumination at the exposure plane than the blackened tubes of the preferred embodiment, but would not provide as much collimation. Further, it is possible to construct the light carriage to permit the easy substitution of one type of collimator for another, depending upon the particular requirements at the time.

Accordingly, it will be seen that the present invention provides a method of contact printing which simultaneously exposes sensitized material and draws a vacuum between the original and the film. The method permits the use of a printer which employs a short optical light path, made possible by the mechanical light collimator, which is both compact and inexpensive, and which produces substantially parallel light rays in a short distance. The use of the compact mechanical light collimator, along with the high output aperture bulbs, permits the present compact contact printer arrangement which produces the required graphic arts quality contact printing without the resultant undercutting found in devices of the prior art. Also, the present method permits the use of the "top down" exposure configuration, wherein the film to be exposed is the element directly held in contact with the vacuum table, which facilitates the use of a plurality of originals, each containing a different image to be imparted to the film, to expose a single film. Thus a composite image can be more easily created since the film can be left in position after a first exposure, with the first original being removed and replaced with another "original", without the necessity of reregistering the film. Still further, the volume of space occupied by the contact printer employing the method of the present invention is substantially reduced from that required by contact printers of the prior art without increasing the risk of exposing the operator to UV radiation.

Moreover, with the method of the present invention a variety of graphic art films and papers can be exposed without requiring extensive adjustments or modifications. Thus, the present invention provides a method of contact printing which is versatile in that it is easily adaptable to a wide variety of films having other spectral senitivities, e.g. infrared-sensitive film, x-ray films, orthochromatic films, etc., such as by changing the bulbs for bulbs having the appropriate light-emitting characteristics and suitable adjustments to the apparatus control. Accordingly, the apparatus of the present invention provides a method of contact printing which would easily fit into the production environment, providing high productivity, high quality images, adaptability, and low cost.

The invention has been described with reference to specific embodiments and variations, but it should be apparent that other modifications and variations can be made within the spirit and scope of the invention, which is defined by the following claims.

We claim:

1. The method of contact printing half-tone image comprising the steps of supporting a photosensitive film and at least partially transparent original containing a half-tone image to be reproduced in superposed relationship on a vacuum table, providing an elongated beam of light on a movable light carriage for exposing said film through said original with the beam having a length at least equal to one dimension of said film and a relatively narrow width, moving said light carriage with said light to move said beam of light transversely of the length of said beam over said vacuum table surface over said superposed film and original, unrolling a transparent cover sheet from said light carriage and applying said cover sheet over said superposed film and original simultaneously with the movement of said light in a first pass over said film and original whereby said superposed film and original are scanned by said light and said film is exposed through said cover sheet and said original, removing and rerolling said cover sheet as said light carriage is returned to the starting position, collimating the light with means disposed between said light and said cover sheet, sensing the light intensity at the vacuum table surface, and regulating the speed of said light carriage in response to the intensity of said light whereby said light moving speed is varied in direct relationship with said light intensity.

2. The method of contact printing a half-tone image according to claim 1, wherein the photosensitive film is sensitive to ultraviolet radiation and wherein said elongated beam of light contains a substantial portion of ultraviolet radiation to expose said film.

3. The method of contact printing a half-tone image according to claim 1, including the step of registering the exposure speed of said film and regulating the speed of said light carriage in response to the exposure speed of said film whereby the light moving speed is varied in direct relationship with said light intensity and said exposure speed.

* * * * *